(12) United States Patent
Chigier et al.

(10) Patent No.: US 8,504,369 B1
(45) Date of Patent: Aug. 6, 2013

(54) MULTI-CURSOR TRANSCRIPTION EDITING

(75) Inventors: Benjamin Chigier, Wellesley, MA (US); Edward A. Brody, Cambridge, MA (US); Daniel Edward Chernin, Acton, MA (US); Roger S. Zimmerman, Wellesley, MA (US)

(73) Assignee: Nuance Communications, Inc., Burlington, MA (US)

( * ) Notice: Subject to any disclaimer, the term of this patent is extended or adjusted under 35 U.S.C. 154(b) by 1250 days.

(21) Appl. No.: 10/859,889

(22) Filed: Jun. 2, 2004

(51) Int. Cl.
*G10L 11/00* (2006.01)

(52) U.S. Cl.
USPC .......... 704/270; 704/246; 704/247; 704/251; 704/252; 704/271

(58) Field of Classification Search
USPC ................. 704/246, 251, 270–271
See application file for complete search history.

(56) References Cited

U.S. PATENT DOCUMENTS

| | | | |
|---|---|---|---|
| 3,648,249 A | 3/1972 | Goldsberry | |
| 3,676,856 A | 7/1972 | Manly | |
| 4,637,797 A | 1/1987 | Whitney et al. | |
| 4,701,130 A | 10/1987 | Whitney et al. | |
| 5,146,439 A | 9/1992 | Jachmann et al. | 369/25 |
| 5,519,808 A | 5/1996 | Benton, Jr. et al. | 395/2.79 |
| 5,602,982 A | 2/1997 | Judd et al. | 395/326 |
| 5,664,896 A | 9/1997 | Blumberg | |
| 5,748,888 A | 5/1998 | Angelo et al. | 395/186 |
| 5,812,882 A | 9/1998 | Raji et al. | 395/892 |
| 5,857,212 A * | 1/1999 | Van De Vanter | 715/519 |
| 5,875,429 A | 2/1999 | Douglas | |
| 5,875,448 A * | 2/1999 | Boys et al. | 715/531 |
| 5,911,485 A | 6/1999 | Rossmann | |
| 5,960,447 A | 9/1999 | Holt et al. | |
| 6,055,495 A | 4/2000 | Tucker et al. | |
| 6,064,965 A | 5/2000 | Hanson | |
| 6,076,059 A * | 6/2000 | Glickman et al. | 704/260 |
| 6,122,614 A | 9/2000 | Kahn et al. | |
| 6,141,011 A | 10/2000 | Bodnar et al. | |
| 6,195,637 B1 | 2/2001 | Ballard et al. | |
| 6,307,548 B1 | 10/2001 | Flinchem et al. | |
| 6,338,038 B1 | 1/2002 | Hanson | |
| 6,374,225 B1 | 4/2002 | Hejna, Jr. | 704/270 |
| 6,415,256 B1 * | 7/2002 | Ditzik | 704/231 |
| 6,434,523 B1 | 8/2002 | Monaco | |
| 6,438,545 B1 | 8/2002 | Beauregard et al. | 707/6 |

(Continued)

FOREIGN PATENT DOCUMENTS

| | | |
|---|---|---|
| WO | WO 03/034404 | 4/2003 |
| WO | WO 03/034404 A1 | 4/2003 |

OTHER PUBLICATIONS

Batty et al., "The development of a portable real-time display of voice source characteristics", *IEEE*, 2:419-422 (2000).

(Continued)

*Primary Examiner* — Leonard Saint Cyr
(74) *Attorney, Agent, or Firm* — Wolf, Greenfield & Sacks, P.C.

(57) ABSTRACT

A device, for use by a transcriptionist in a transcription editing system for editing transcriptions dictated by speakers, includes, in combination, a monitor configured to display visual text of transcribed dictations, an audio mechanism configured to cause playback of portions of an audio file associated with a dictation, and a cursor-control module coupled to the audio mechanism and to the monitor and configured to cause the monitor to display multiple cursors in the text.

24 Claims, 6 Drawing Sheets

U.S. PATENT DOCUMENTS

| | | |
|---|---|---|
| 6,457,031 B1 | 9/2002 | Hanson |
| 6,542,091 B1 | 4/2003 | Rasanen |
| 6,611,802 B2 | 8/2003 | Lewis et al. |
| 6,760,700 B2 | 7/2004 | Lewis et al. |
| 6,763,320 B2 | 7/2004 | Kimble |
| 6,792,409 B2 | 9/2004 | Wutte |
| 6,802,041 B1 | 10/2004 | Rehm |
| 6,865,258 B1 | 3/2005 | Polcyn ............ 379/88.01 |
| 6,912,498 B2 | 6/2005 | Stevens et al. |
| 6,950,994 B2 | 9/2005 | Dharap ............ 715/864 |
| 6,961,699 B1* | 11/2005 | Kahn et al. ............ 704/235 |
| 6,986,106 B2 | 1/2006 | Soin et al. |
| 6,993,246 B1 | 1/2006 | Pan et al. |
| 6,996,445 B1 | 2/2006 | Kamijo ............ 700/94 |
| 7,016,844 B2 | 3/2006 | Othmer et al. ............ 704/270.1 |
| 7,137,076 B2 | 11/2006 | Iwema et al. |
| 7,149,680 B2 | 12/2006 | Storisteanu et al. |
| 7,196,691 B1 | 3/2007 | Zweig |
| 7,206,938 B2 | 4/2007 | Bender et al. |
| 7,236,931 B2 | 6/2007 | He et al. |
| 7,236,932 B1* | 6/2007 | Grajski ............ 704/277 |
| 7,260,529 B1 | 8/2007 | Lengen |
| 7,292,975 B2 | 11/2007 | Lovance et al. |
| 7,382,359 B2 | 6/2008 | Griffin |
| 7,508,324 B2 | 3/2009 | Suraqui |
| 7,515,903 B1* | 4/2009 | Cast ............ 455/413 |
| 7,580,838 B2 | 8/2009 | Divay et al. |
| 7,610,562 B2 | 10/2009 | Rockey et al. |
| 7,958,443 B2 | 6/2011 | Rosen et al. |
| 2002/0002459 A1 | 1/2002 | Lewis et al. |
| 2002/0013707 A1* | 1/2002 | Shaw et al. ............ 704/257 |
| 2002/0013709 A1* | 1/2002 | Ortega et al. ............ 704/260 |
| 2002/0049588 A1 | 4/2002 | Bennett et al. |
| 2002/0065653 A1* | 5/2002 | Kriechbaum et al. ........ 704/231 |
| 2002/0115476 A1 | 8/2002 | Padawer et al. |
| 2002/0143533 A1* | 10/2002 | Lucas et al. ............ 704/235 |
| 2002/0143534 A1 | 10/2002 | Hol |
| 2002/0143544 A1 | 10/2002 | Gschwendtner |
| 2003/0004724 A1* | 1/2003 | Kahn et al. ............ 704/260 |
| 2003/0007018 A1 | 1/2003 | Seni et al. |
| 2003/0046080 A1 | 3/2003 | Hejna, Jr. ............ 704/270 |
| 2003/0067495 A1 | 4/2003 | Pu et al. ............ 345/811 |
| 2003/0083885 A1 | 5/2003 | Frimpong-Ansah |
| 2003/0225578 A1* | 12/2003 | Kahn et al. ............ 704/243 |
| 2004/0029092 A1 | 2/2004 | Orr et al. |
| 2004/0093220 A1* | 5/2004 | Kirby et al. ............ 704/278 |
| 2004/0172245 A1* | 9/2004 | Rosen et al. ............ 704/235 |
| 2004/0243760 A1* | 12/2004 | Dahman et al. ............ 711/113 |
| 2005/0055332 A1 | 3/2005 | Vasey |
| 2005/0149747 A1 | 7/2005 | Wesinger et al. ............ 713/200 |
| 2006/0167686 A1* | 7/2006 | Kahn ............ 704/235 |
| 2006/0176283 A1 | 8/2006 | Suraqui |
| 2006/0206943 A1 | 9/2006 | Ellison et al. ............ 726/26 |
| 2006/0253895 A1 | 11/2006 | Brandofino et al. ............ 726/2 |
| 2006/0272025 A1 | 11/2006 | Mononen ............ 726/26 |
| 2007/0143857 A1 | 6/2007 | Ansari ............ 726/26 |
| 2007/0265845 A1 | 11/2007 | Bennett et al. |
| 2007/0283444 A1 | 12/2007 | Jang ............ 726/26 |
| 2007/0294745 A1 | 12/2007 | Tan et al. ............ 726/2 |
| 2007/0300287 A1 | 12/2007 | Wynne et al. ............ 726/2 |
| 2008/0034218 A1 | 2/2008 | Bender |

OTHER PUBLICATIONS

International Search Report for International Application No. PCT/IB02/01062 mailed Jun. 27, 2002 from pending co-application U.S. Appl. No. 10/106,981.

* cited by examiner

MULTI-CURSOR TRANSCRIPTION EDITING

BACKGROUND OF THE INVENTION

Healthcare costs in the United States account for a significant share of the GNP. The affordability of healthcare is of great concern to many Americans. Technological innovations offer an important leverage to reduce healthcare costs.

Many Healthcare institutions require doctors to keep accurate and detailed records concerning diagnosis and treatment of patients. Motivation for keeping such records include government regulations (such as Medicare and Medicaid regulations), desire for the best outcome for the patient, and mitigation of liability. The records include patient notes that reflect information that a doctor or other person adds to a patient record after a given diagnosis, patient interaction, lab test or the like.

Record keeping can be a time-consuming task, and the physician's time is valuable. The time required for a physician to hand-write or type patient notes can represent a significant expense. Verbal dictation of patient notes offers significant time savings to physicians, and is becoming increasingly prevalent in modern healthcare organizations.

Over time, a significant industry has evolved around the transcription of medical dictation. Several companies produce special-purpose voice mailbox systems for storing medical dictation. These centralized systems hold voice mailboxes for a large number of physicians, each of whom can access a voice mailbox by dialing a phone number and putting in his or her identification code. These dictation voice mailbox systems are typically purchased or shared by healthcare institutions. Prices can be over $100,000 per voice mailbox system. Even at these prices, these centralized systems save healthcare institutions vast sums of money over the cost of maintaining records in a more distributed fashion.

Using today's voice mailbox medical dictation systems, when a doctor completes an interaction with a patient, the doctor calls a dictation voice mailbox, and dictates the records of the interaction with the patient. The voice mailbox is later accessed by a medical transcriptionist who listens to the audio and transcribes the audio into a text record. The playback of the audio data from the voice mailbox may be controlled by the transcriptionist through a set of foot pedals that mimic the action of the "forward", "play", and "rewind" buttons on a tape player. Should a transcriptionist hear an unfamiliar word, the standard practice is to stop the audio playback and look up the word in a printed dictionary.

The medical transcriptionist's time is less costly for the hospital than the doctor's time, and the medical transcriptionist is typically much more familiar with the computerized record-keeping systems than the doctor is, so this system offers a significant overall cost saving to the hospital.

Expedient processing of doctor's dictation is often desirable so that records can be passed between one part of a healthcare institution and another (such as from Radiology to Surgery), or so that records can be passed to another institution if the next step in a patient's care requires that the patient be moved to another facility. In addition to being timely, accuracy of medical transcriptions is of paramount importance. A mistake in a medical transcription could mean the difference between life and death. In transcribing doctor's orders for such procedures as chemotherapy and radiation therapy for cancer patients, an elaborate system of double-checking by separate people is standard to mitigate risk.

SUMMARY OF THE INVENTION

In general, in an aspect, the invention provides a device for use by a transcriptionist in a transcription editing system for editing transcriptions dictated by speakers, the device including, in combination, a monitor configured to display visual text of transcribed dictations, an audio mechanism configured to cause playback of portions of an audio file associated with a dictation, and a cursor-control module coupled to the audio mechanism and to the monitor and configured to cause the monitor to display multiple cursors in the text.

Implementations of the invention may include one or more of the following features. The cursor-control module is configured to cause the monitor to display multiple cursors in the text that indicate different functionality. The cursor-control module is configured to cause the monitor to display an audio cursor accentuating a portion of the text, the audio cursor accentuating different text as the audio file is played using the audio mechanism, and a text cursor indicative of a position in the text where editing commands will be implemented. The audio cursor comprises at least one of a rectangular box surrounding text corresponding to a portion of the audio file, a rectangular box surrounding a line of text, a vertical line, an inverse-video portion of the monitor, and bolding of a portion of the text. The cursor-control module is configured to determine wherein to cause the monitor to display the audio cursor by using a token-alignment file that associates portions of the audio file with portions of the text. The cursor-control module is configured to move at least one of the audio cursor and the text cursor to a location of the other of the text cursor and the audio cursor, respectively. The audio mechanism is configured to determine and play a portion of the audio file corresponding to text at the location of the audio cursor when the audio cursor is moved to the location of the text cursor. The device further includes a change-recording apparatus configured to record changes made to the text and associate the changes with portions of the audio file whereby the recorded changes can be used to adapt speech recognition apparatus in accordance with the changed text and the associated portions of the audio file.

In general, in another aspect, the invention provides a computer program product residing on a computer-readable medium and including computer-readable instructions for causing a computer to display visual text of transcribed dictations, cause playback of portions of an audio file associated with a dictation, and cause the monitor to display multiple cursors in the text.

Implementations of the invention may include one or more of the following features. The instructions are configured to cause the monitor to display an audio cursor accentuating a portion of the text with the audio cursor accentuating different text as the audio file is played, and a text cursor indicative of a position in the text where editing commands will be implemented. The cursor-control module is configured to determine where to cause the monitor to display the audio cursor by using a token-alignment file that associates portions of the audio file with portions of the text. The computer program product further includes instructions for causing the computer to move at least one of the audio cursor and the text cursor to a location of the other of the text cursor and the audio cursor, respectively. The computer program product further includes instructions for causing the computer to determine and cause playing of a portion of the audio file corresponding to text at the location of the audio cursor when the audio cursor is moved to the location of the text cursor. The computer program product further includes instructions for causing the computer to record changes made to the text and associate the changes with portions of the audio file whereby the recorded changes can be used to adapt speech recognition apparatus in accordance with the changed text and the associated portions of the audio file.

In general, in another aspect, the invention provides a method of processing text transcribed from an audio file, the method including displaying text of a transcribed dictation on a monitor, playing portions of an audio file associated with the dictation; displaying an audio cursor in the text on the monitor, the audio cursor accentuating a portion of the text with the audio cursor accentuating different text as the audio file is played, and displaying a text cursor in the text on the monitor, the text cursor being indicative of a position in the text where editing commands will be implemented.

Implementations of the invention may include one or more of the following features. The method further includes using a token-alignment file that associates portions of the audio file with portions of the text to determine where to display the audio cursor. The method further includes moving at least one of the audio cursor and the text cursor to a location of the other of the text cursor and the audio cursor, respectively, in response to receiving a corresponding command. The method further includes playing of a portion of the audio file corresponding to text at the location of the audio cursor if the audio cursor is moved to the location of the text cursor. The method further includes recording changes made to the text, and associating the changes with portions of the audio file. The method further includes using the recorded changes to adapt speech recognition apparatus in accordance with the changed text and the associated portions of the audio file.

In general, in another aspect, the invention provides a method of processing a recorded dictation, the method including analyzing the recorded dictation in accordance with speech models to convert the recorded dictation to a draft text, storing the draft text, and producing and recording a token-alignment file that associates portions of the draft text with portions of the audio file, the token-alignment file including tokens at least some of which are indicative of portions of the draft text, the tokens indicating beginnings and ends of portions of the recorded dictation associated with the portions of the draft text such that the portions of the recorded dictation are associated with corresponding portions of the draft text even if the corresponding portions of the draft text, if spoken, do not correspond identically to the corresponding portions of the recorded dictation.

Implementations of the invention may include one or more of the following features. Producing and recording the token-alignment file includes producing and recording tokens for which there is no corresponding draft text. The method further includes receiving a revised text associated with the recorded dictation, and using indicia of differences between the revised text and the draft text and the associated recorded dictation to modify the speech models for converting other recorded dictations to other draft texts.

Various aspects of the invention may provide one or more of the following capabilities. The cost of medical transcription can be reduced and/or the accuracy of medical transcription increased. The expediency and turn-around time of medical transcription can be improved. Editing of transcriptions can be performed faster than with previous techniques. Transcribed text can be edited during playback of transcribed audio. Text other than that associated with audio currently being played can be edited without stopping playback of audio associated with a text document. Transcribed text can be selected and its corresponding audio played, e.g., regardless of a current portion of audio being played or having last been played. Transcriptionist productivity can be improved. Transcriptionist fatigue can be reduced.

These and other capabilities of the invention, along with the invention itself, will be more fully understood after a review of the following figures, detailed description, and claims.

DETAILED DESCRIPTION OF PREFERRED EMBODIMENTS

Embodiments of the invention can provide multiple cursors for use in editing text documents each of which is associated with a digital audio signal of speech to be transcribed. An audio cursor is provided that highlights text associated with corresponding audio being played. The audio cursor tracks the audio signal to help the transcriptionist follow along visually with the text as the associated audio plays. A text cursor can be manipulated independently of the audio cursor by a transcriptionist. The text cursor indicates the location of editing to the transcribed text, e.g., through a keyboard. The text cursor can be positioned and edits to the text made and/or the audio cursor made to coincide with the text cursor and have the corresponding audio played. Using embodiments of the invention, a transcriptionist can process multi-modal inputs and reduce the amount of time the transcriptionist would use to review and revise draft documents using previous techniques. Other embodiments are within the scope of the invention.

Figure 1:
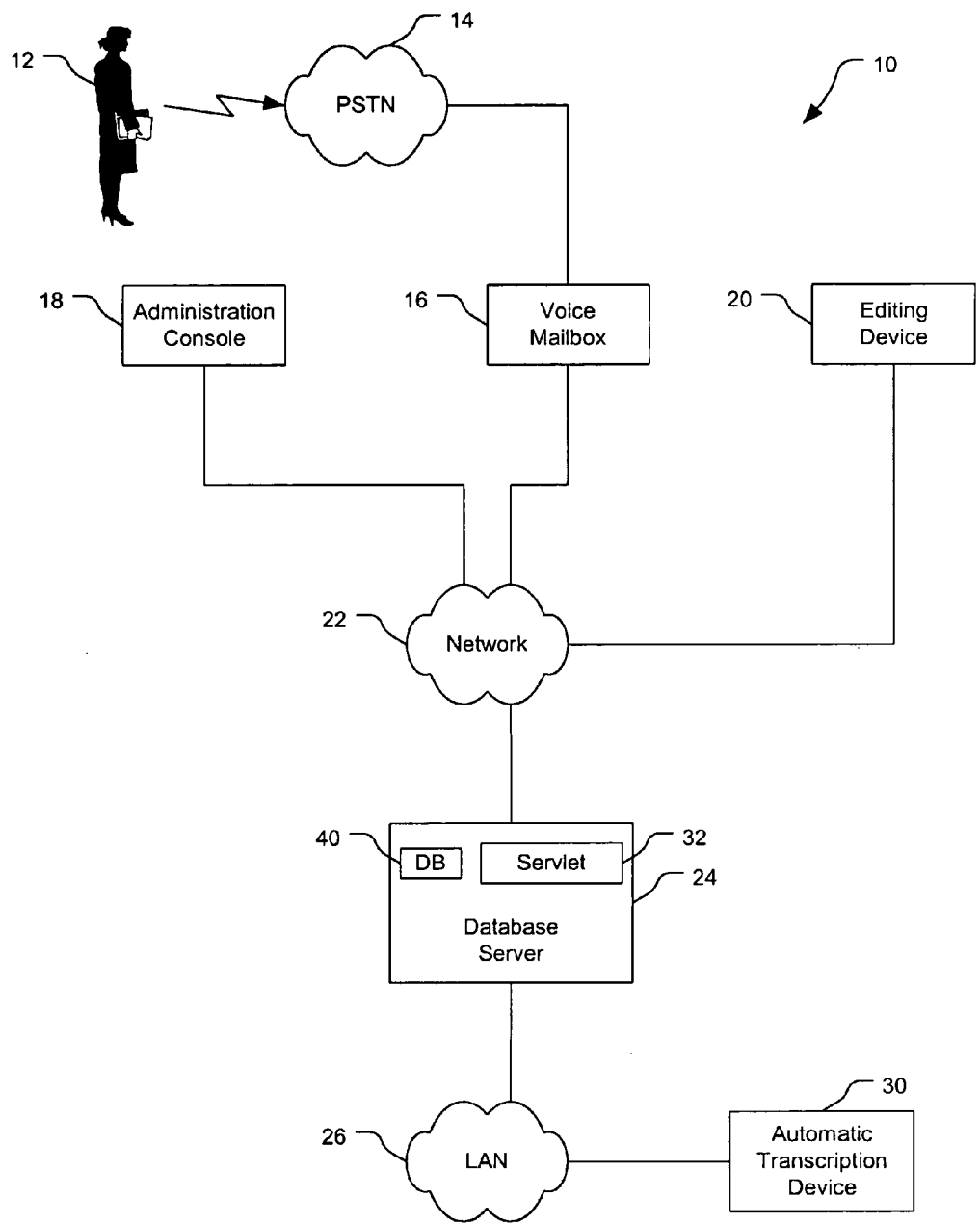
FIG. 1 is a simplified diagram of a system for transcribing dictations and editing corresponding transcriptions.

Referring to FIG. 1, a system 10 for transcribing audio and editing transcribed audio includes a speaker/person 12, a communications network, 14, a voice mailbox system 16, and administrative console 18, an editing device 20, a communications network 22, a database server 24, a communications network 26, and an automatic transcription device 30. Here, the network 14 is preferably a public switched telephone network (PSTN) although other networks, including packet-switched networks could be used, e.g., if the speaker 12 uses an Internet phone for dictation. The network 22 is preferably a packet-switched network such as the global packet-switched network known as the Internet. The network 26 is preferably a packet-switched, local area network (LAN). Other types of networks may be used, however, for the networks 14, 22, 26, or any or all of the networks 14, 22, 26 may be eliminated, e.g., if items shown in FIG. 1 are combined or eliminated.

Preferably, the voice mailbox system 16, the administrative console 18, and the editing device 20 are situated "off site" from the database server 24 and the automatic transcription device 30. These systems/devices 16, 18, 20, however, could be located "on site," and communications between them took place, e.g., over a local area network. Similarly, it is possible to locate the automatic transcription device 30 off-site, and have the device 30 communicate with the database server 24 over the 22.

The network 14 is configured to convey dictation from the speaker 12 to the voice mailbox system 16. Preferably, the speaker 12 dictates into an audio transducer such as a telephone, and the transduced audio is transmitted over the telephone network 14 into the voice mailbox system 16, such as the Intelliscript™ product made by eScription™ of Needham, Mass. The speaker 12 may, however, use means other than a standard telephone for creating a digital audio file for each dictation. For example, the speaker 12 may dictate into a handheld PDA device, that includes its own digitization mechanism for storing the audio file. Or, the speaker 12 may use a standard "dictation station," such as those provided by many vendors. Still other devices may be used by the speaker 12 for dictating, and possibly digitizing the dictation, and sending it to the voice mailbox system 16.

The voice mailbox system 16 is configured to digitize audio from the speaker 12 to produce a digital audio file of the dictation. For example, the system 16 may use the Intelliscript™ product made by eScription.

The voice mailbox system 16 is further configured to prompt the speaker 12 to enter an identification code and a worktype code. The speaker 12 can enter the codes, e.g., by pressing buttons on a telephone to send DTMF tones, or by speaking the codes into the telephone. The system 16 may provide speech recognition to convert the spoken codes into a digital identification code and a digital worktype code. The mailbox system 16 is further configured to store the identifying code and the worktype code in association with the dictation. The system 16 preferably prompts the speaker 12 to provide the worktype code at least for each dictation related to the medical field. The worktype code designates a category of work to which the dictation pertains, e.g., for medical applications this could include Office Note, Consultation, Operative Note, Discharge Summary, Radiology report, etc.

The voice mailbox system 16 is further configured to transmit the digital audio file and speaker identification code over the network 22 to the database server 24 for storage. This transmission is accomplished by the system 16 product using standard network transmission protocols communicating with the database server 24.

The database server 24 is configured to store the incoming data from the voice mailbox system 16, as well as from other sources. The database server 24 may include the EditScript Server™ database product from eScription. Software of the database server is configured to produce a database record for the dictation, including a file pointer to the digital audio data, and a field containing the identification code for the speaker 12. If the audio and identifying data are stored on a PDA, the PDA may be connected to a computer running the HandiScript™ software product made by eScription that will perform the data transfer and communication with the database server 24 to enable a database record to be produced for the dictation.

Preferably, all communication with the database server 24 is intermediated by a "servlet" application 32 that includes an in-memory cached representation of recent database entries. The servlet 32 is configured to service requests from the voice mailbox system 16, the automatic transciption device, the editing device 20, and the administrative console 18, reading from the database when the servlet's cache does not contain the required information. The servlet 32 includes a separate software module that helps ensure that the servlet's cache is synchronized with the contents of the database. This helps allow the database to be off-loaded of much of the real-time data-communication and to grow to be much larger than otherwise possible. For simplicity, however, the below discussion does not refer to the servlet, but all database access activities may be realized using the servlet application 32 as an intermediary.

The automatic transcription device 30 may access the database 40 in the database server 24 over the data network 26 for transcribing the stored dictation. The automatic transcription device 30 uses an automatic speech recognition (ASR) device (e.g., software) to produce a draft transcription for the dictation. An example of ASR technology is the AutoScript™ product made by eScription, that also uses the speaker and, optionally, worktype identifying information to access speaker and speaker-worktype dependent ASR models with which to perform the transcription. The device 30 transmits the draft transcription over the data network 26 to the database server 24 for storage in the database and to be accessed, along with the digital audio file, by the editing device 20.

The device 30 is further configured to affect the presentation of the draft transcription. The device 30, as part of speech recognition or as part of post-processing after speech recognition, can add or change items affecting document presentation such as formats, abbreviations, and other text features. The device 30 includes a speech recognizer and may also include a post-processor for performing operations in addition to the speech recognition, although the speech recognizer itself may perform some or all of these additional functions.

The transcription device 30 is further configured to produce a token-alignment file that synchronizes the audio with the corresponding text. This file comprises a set of token records, with each record preferably containing a token, a begin index, and an end index. The token comprises a character or a sequence of characters that are to appear on the screen during a word-processing session, or one or more sounds that may or may not appear as text on a screen. A begin index comprises an array reference into the audio file corresponding to the place in the audio file where the corresponding token begins. The end index comprises an array reference into the digital audio file corresponding to the point in the audio file where the corresponding token ends. As an alternative, the end index may not exist separately, with it being assumed that the starting point of the next token (the next begin index) is also the ending point of the previous token. The transcription device 30 can store the token-alignment file in the database 40.

The token-alignment file may contain further information, such as a display indicator and/or a playback indicator. The display indicator's value indicates whether the corresponding token is to be displayed, e.g., on a computer monitor, while the transcription is being edited. Using non-displayed tokens can help facilitate editing of the transcription while maintaining synchronization between on-screen tokens and the digital audio file. For example, a speaker may use an alias, e.g., for a heading, and standard heading (e.g., Physical Examination) may be displayed while the words actually spoken by the speaker (e.g., "On exam today") are audibly played but not displayed as text (hidden). The playback indicator's value indicates whether the corresponding token has audio associated with the token. Using the playback indicator can also help facilitate editing the transcription while maintaining synchronization between on-screen tokens and the digital audio file. The playback indicator's value may be adjusted dynamically during audio playback, e.g., by input from the transcriptionist. The adjustment may, e.g., cause audio associated with corresponding tokens (e.g., hesitation words) to be skipped partially or entirely, that may help increase the transcriptionist's productivity.

The tokens stored in the token-alignment file may or may not correspond to words. Instead, a token may represent one or more characters that appear on a display during editing of the transcription, or sounds that occur in the audio file. Thus, the written transcription may have a different form and/or format than the exact words that were spoken by the person 12. For example, a token may represent conventional words such as "the," "patient," or "esophagogastroduodenoscopy," multiple words, partial words, abbreviations or acronyms, numbers, dates, sounds (e.g., a cough, a yawn, a bell), absence of sound (silence), etc. For example, the speaker 12 may say "USA" and the automatic transcription device 30 may interpret and expand this into "United States of America." In this example, the token is "United States of America" and the begin index would point to the beginning of the audio signal for "USA" and, if the token-alignment file uses end indexes, the end index would point to the end of the audio signal "USA." As another example, the speaker 12 might say "April 2 of last year," and the text might appear on the display as "Apr. 2, 2003." The tokens, however, can synchronize the text "Apr. 2, 2003" with the audio of "April 2 of last year." As another example, the speaker 12 might say "miles per hour" while the text is displayed as "MPH." Using the tokens, the speech recognizer 30, or a post-processor in or separate from the device 30, may alter, expand, contract, and/or format the spoken words when converting to text without losing the audio synchronization. Tokens preferably have variable lengths, with different tokens having different lengths.

The token-alignment file provides an environment with many features. Items may appear on a screen but not have any audio signal associated with them (e.g., implicit titles and headings). Items may have audio associated with them and may appear on the screen but may not appear as words (e.g., numeric tokens such as "120/88"). Items may have audio associated with them, appear on the screen, and appear as words contained in the audio (e.g., "the patient showed delayed recovery"). Multiple words may appear on the screen corresponding to audio that is an abbreviated form of what appears on the screen (e.g., "United States of America" may be displayed corresponding to audio of "USA"). Items may have audio associated with them but not have corresponding symbols appear on the screen (e.g., a cough, an ending salutation such as "that's all," commands or instructions to the transcriptionist such as "start a new paragraph," etc.).

The editing device 20 is configured to be used by a transcriptionist to access and edit the draft transcription stored in the database of the database server 24. The editing device 20 includes a computer (e.g., display, keyboard, mouse, monitor, memory, and a processor, etc.), an attached foot-pedal, and appropriate software such as the EditScript™ software product made by eScription. The transcriptionist can request a dictation job by, e.g., clicking on an on-screen icon. The request is serviced by the database server 24, that finds the dictation for the transcriptionist, and transmits the corresponding audio file and the draft transcription text file. The transcriptionist edits the draft using the editing device 20 and sends the edited transcript back to the database server 24. For example, to end the editing the transcriptionist can click on an on-screen icon button to instruct the editing device 20 to send the final edited document to the database server 24 via the network 22, along with a unique identifier for the transcriptionist. With the data sent from the editing device 20, the database in the server 24 contains, for each dictation: a speaker identifier, a transcriptionist identifier, a file pointer to the digital audio signal, and a file pointer to the edited text document.

The edited text document can be transmitted directly to a customer's medical record system or accessed over the data network 22 from the database by the administrative console 18. The console 18 may include an administrative console software product such as Emon™ made by eScription.

Figure 2:
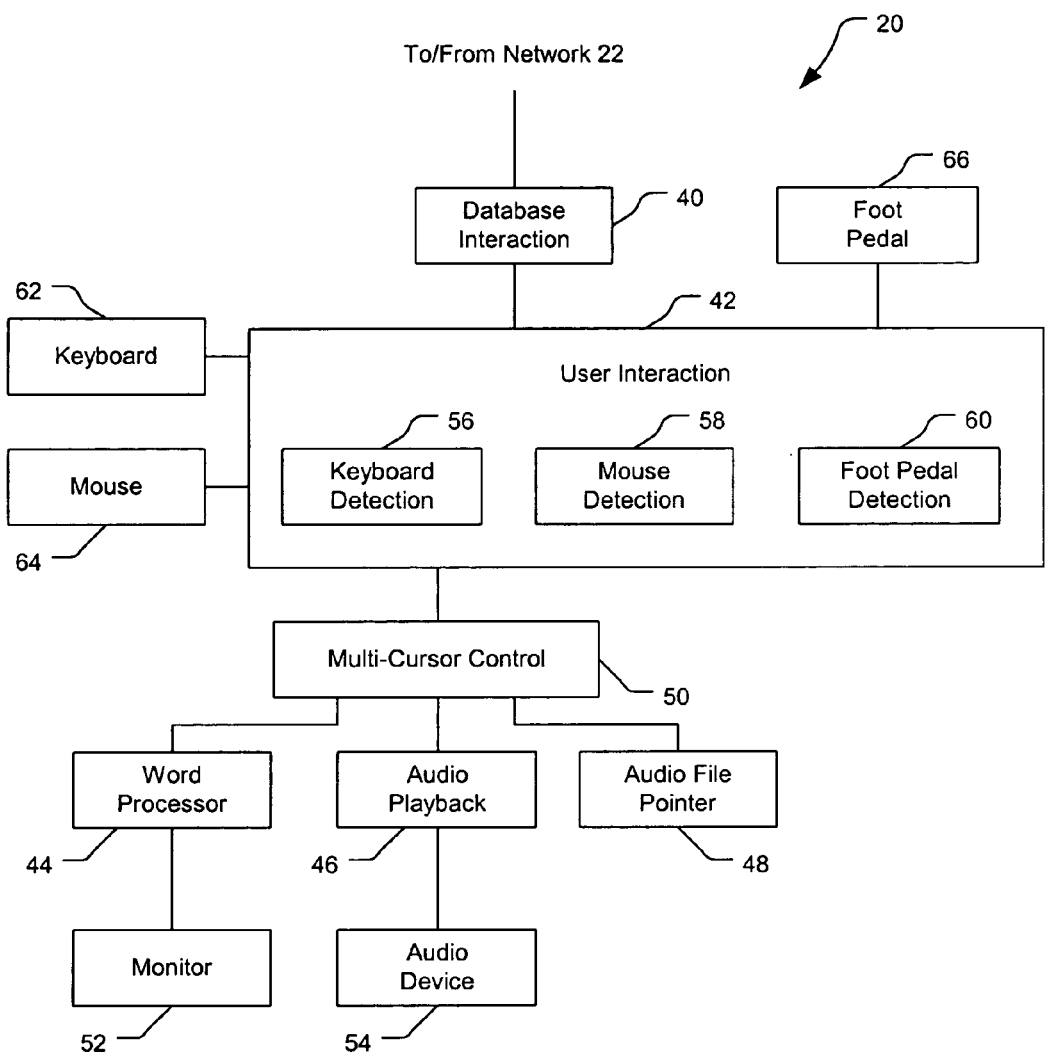
FIG. 2 is a simplified block diagram of an editing device of the system shown in FIG. 1.

Referring to FIG. 2, components of the editing device 20, e.g., a computer, include a database interaction module 40, a user interface 42, a word processor module 44, an audio playback module 46, an audio file pointer 48, a cursor module 50, a monitor 52, and an audio device 54. A computer implementing portions of the editing device 20 includes a processor and memory that stores appropriate computer-readable, computer-executable software code instructions that can cause the processor to execute appropriate instructions for performing functions described. The monitor 52 and audio device 54, e.g., speakers, are physical components while the other components shown in FIG. 2 are functional components that may be implemented with software, hardware, etc., or combinations thereof. The audio playback device 46, such as a SoundBlaster® card, is attached to the audio output transducer 54 such as speakers or headphones. The transcriptionist can use the audio device 54 (e.g., headphones or a speaker) to listen to audio and can view the monitor 52 to see the corresponding text. The transcriptionist can use the foot pedal 66, the keyboard 62, and/or the mouse 64 to control the audio playback. The database interaction, audio playback, and editing of the draft transcription is accomplished by means of the appropriate software such as the EditScript Client™ software product made by eScription. The editing software is loaded on the editing device computer 20 and configured appropriately for interaction with other components of the editing device 20. The editing software can use a standard word processing software library, such as that provided with Microsoft Word®, in order to load, edit and save documents corresponding to each dictation.

The editing software includes the database interaction module 40, the user interface module 42, the word processing module 44, the audio playback module 46, the audio file pointer adjustment module 48, and the multi-cursor control module 50. The control module 50 regulates the interaction between the interface module 42 and the word processor 44, the audio playback module 46, and the audio file pointer 48. The control module 50 regulates the flow of actions relating to processing of a transcription, including playing audio and providing cursors in the transcribed text, as discussed below especially with respect to FIG. 7. The user interface module 42 controls the activity of the other modules and includes keyboard detection 56, mouse detection 58, and foot pedal detection 60 sub-modules for processing input from a keyboard 62, a mouse 64, and a foot-pedal 66. The foot pedal 66 is a standard transcription foot pedal and is connected to the editing device computer through the computer's serial port. The foot pedal 66 preferably includes a "fast forward" portion and a "rewind" portion.

The transcriptionist can request a job from the database by selecting on-screen icon with the mouse 64. The user interface module 42 interprets this mouse click and invokes the database interaction module 40 to request the next job from the database. The database server 24 (FIG. 1) responds by transmitting the audio data file, the draft transcription file, and the token-alignment file to the user interaction module 42. With this information, the editing software can initialize a word-processing session by loading the draft text into the word processing module 44.

The audio playback module 46 is configured to play the audio file stored in the database. For initial playback, the module 46 plays the audio file sequentially. The playback module 46 can, however, jump to audio corresponding to an indicated portion of the transcription and begin playback from the indicated location. The location may be indicated by a transcriptionist using appropriate portions of the editing device 20 such as the keyboard 62, or the mouse 64 as discussed below. For playback that starts at an indicated location, the playback module 46 uses the token-alignment file to determine the location in the audio file corresponding to the indicated transcription text. Since many audio playback programs play audio in fixed-sized sections (called "frames"), the audio playback module 46 may convert the indicated begin index to the nearest preceding frame for playback. For example, an audio device 54 may play only frames of 128 bytes in length. In this example, the audio playback module uses the token-alignment file to find the nearest prior starting frame that is a multiple of 128 bytes from the beginning of the audio file. Thus, the starting point for audio playback may not correspond precisely to the selected text in the transcription.

The transcriptionist can review and edit a document by appropriately controlling portions of the editing device 20. The transcriptionist can regulate the playback using the foot pedal 66, and listen to the audio corresponding to the text as played by the playback module 46 and converted to sound by the audio device 54. Further, the transcriptionist can move a cursor to a desired portion of the display of the monitor 52 using the keyboard 62 and/or mouse 64, and can make edits at the location of the cursor using the keyboard 62 and/or mouse 64.

While the transcriptionist is editing the document, the user interface module 42 can service hardware interrupts from all three of its sub-modules 56, 58, 60. The transcriptionist can use the foot pedal 66 to indicate to that the audio should be "rewound," or "fast-forwarded" to a different time point in the dictation. These foot-pedal presses are serviced as hardware interrupts by the user interaction module 42. Most standard key presses and on-document mouse-clicks are sent to the word processing module 44 to perform the document editing functions indicated and to update the monitor display. Some user interaction, however, may be directed to the audio-playback oriented modules 46, 48, 50, e.g., cursor control, audio position control, and/or volume control. The transcriptionist may indicate that editing is complete by clicking another icon. In response to such an indication, the final text file is sent through the database interaction module 42 to the database server 24.

Figure 3:
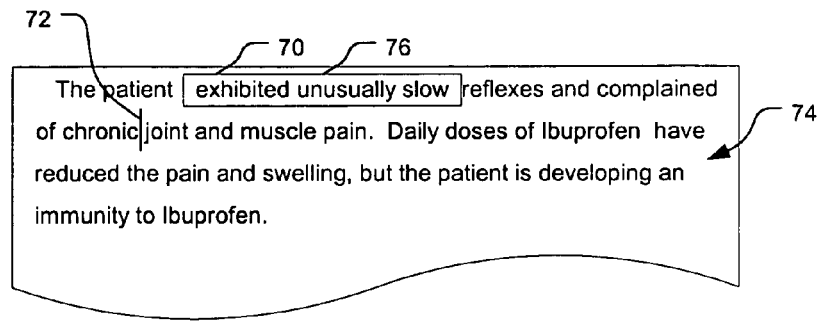
FIGS. 3-5 are portions of a transcribed document showing exemplary embodiments of audio and text cursors.

Referring also to FIG. 3, the cursor module 50 is configured to provide an audio cursor 70 and a text cursor 72 on the monitor 52 in conjunction with the display of the draft transcription 74 for editing by the transcriptionist. The cursor module 50 provides the cursors 70 and 72 independently.

Figure 4:
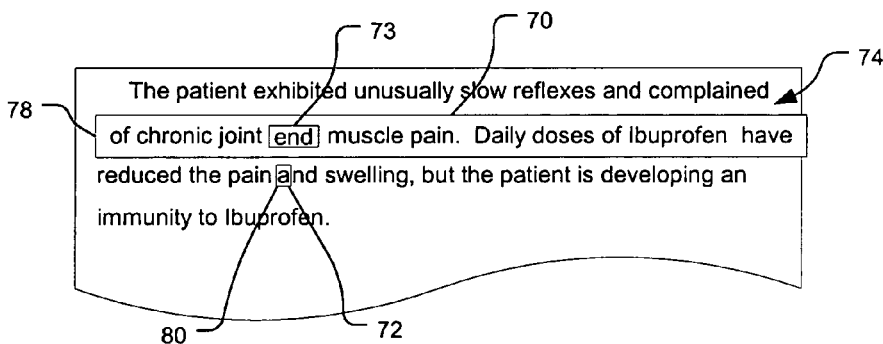
Figure 5:
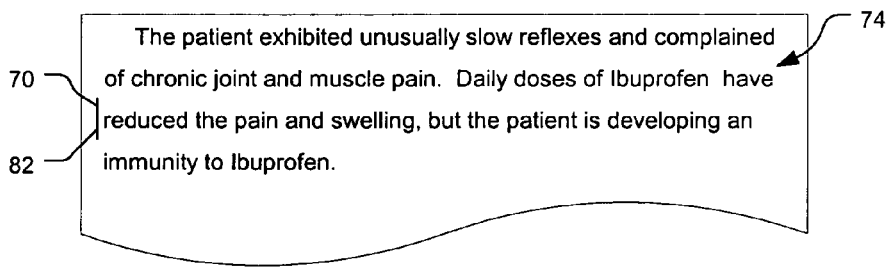

The audio cursor 70, under the control of the cursor module 50, tracks the text in the document 74 as the corresponding audio is played to help the transcriptionist follow along in the text 74 with the corresponding audio. The audio cursor 70 moves in conjunction with the audio, as linked to the text 74 by the token-alignment file, to help the transcriptionist follow the text 74 corresponding to the currently-played audio. In order to highlight the text 74, the audio cursor 70 may take a variety of different forms. For example, as shown in FIG. 3, the audio cursor provides a box 76 around the text of the token corresponding to the audio presently being played. The box 76 may also take a variety of forms to distinguish it from other portions of the document 74, such as a rectangular outline of the box 76, and/or a solid box (e.g., inverse video), and may be of a variety of colors such as red against black letters on a white background. As another example, referring to FIG. 4, the audio cursor 70 may be a box 78 that highlights the entire line (or lines) of text that includes the text of the token corresponding to the audio currently being played. The text cursor 72 could be a box 80, e.g., of a single character in width. A text cursor 73 indicates other possible features of a text cursor, including that a text cursor can highlight an entire word and can be positioned within text highlighted by the audio cursor 70. Further, FIG. 4 illustrates that more than two cursors could be provided. As another example, referring to FIG. 5, the audio cursor 70 could be a vertical line cursor 82 that highlights text, e.g., the beginning of the text of the token currently being played, or the beginning of the line of text including the token currently being played. Other possibilities include using highlighting capabilities or bold characters to transiently emphasize a word, series of words, or line(s) of text. Still other forms of the audio cursor 70 may be used. Preferably, the audio cursor 70 is precisely aligned with the currently-played audio, but the cursor 70 may approximate the audio, e.g., with groups of words or one or more entire lines of text being indicated by the audio cursor 70.

The text cursor 72 provided by the cursor module 50 indicates the current location for editing in the document 74. The transcriptionist can manipulate the keyboard 62 and/or mouse 64 to control the location of the text cursor 74. The cursor 74 indicates where editing will occur, e.g., addition of text through the keyboard 62, deletion of text, alteration of formatting, insertion of paragraph or page breaks, etc. The transcriptionist can edit the document using the text cursor 72 in standard fashion. The text cursor 72 in combination with the audio cursor 70, however, provides for multi-tasking by the transcriptionist. To make edits, the transcriptionist positions the text cursor 72 in standard fashion and makes the desired change(s).

Edits to the text 74 can be made without losing synchronization with the audio. Changes to the text 74 are tracked, with records being made of which characters or other edits are inserted and where, and which characters or other features (e.g., editing, page breaks, etc.) are removed. Preferably, the word processor 44 implements a track-changes feature, maintaining the original document and storing indications of changes.

The track-changes feature implemented by the word processor 44 produces a file of changes (e.g., textual, formatting, etc.) to the original text 74. The information regarding these changes, especially text changes such as different expansions of abbreviations, different spellings, etc., may be used to adapt the speech recognizer 30. In conjunction with the synchronization information provided by the automatic transcription device 30 by means of the token-alignment file, the file of changes provides a useful tool for continuous learning/improvement of speech models used for speech recognition by the automatic transcription device 30.

The text cursor 72 may be used to change the location of the audio cursor 70, and thus the audio currently played through commands, e.g., from the keyboard 62 and/or the mouse 64, implemented by the cursor control module 50. Movement to a different part of the audio is typically implemented by the audio file pointer module 48 by incrementing or decrementing a pointer into the digital audio file. The location of the audio cursor 70 and thus the current audio for playback, however, may be changed using the text cursor 72. The transcriptionist can position the text cursor 72 to the desired portion of the text 74 for audio playback and actuate appropriate commands. For example, the transcriptionist may use one or more hot keys (e.g., a sequence of keys) and/or one or more mouse clicks (e.g., on screen icons) to cause the audio cursor 70 to move to the position of the text cursor 72, with the audio file pointer being adjusted accordingly. The correct position in the audio file is determined by the audio file pointer module 48 by finding the corresponding token in the token-alignment file. The corresponding token may be a nearest, preferably preceding, token that is associated with text in the document 74. Thus, if the transcriptionist attempts to position the audio cursor 70 in text that was added after speech recognition, e.g., added by the transcriptionist, then the audio file pointer module 48 uses track-changes information from the word processor 44 to determine the appropriate token. The module 48 determines that the text at the position of the text cursor 72 is not in the token-alignment file, and finds the token in the token-alignment file that is nearest, and preferably preceding, the inserted text using information regarding the original document from the track-changes information.

The text cursor 72 may also be moved to the position of the audio cursor 70. For example, one or more hot keys and/or one or more mouse clicks can be used to cause the text cursor 72 to jump from its current position to a position at, adjacent, or near the position of the audio cursor 70. Thus, for example, if the transcriptionist hears audio and recognizes that the highlighted corresponding text should be edited, then the transcriptionist can cause the text cursor 72 to jump to the location of the audio cursor 70 to quickly position the text cursor 72 for editing of the desired text. Preferably, the text cursor 72 can highlight the text highlighted by the audio cursor 70 such that text entered by the transcriptionist will overwrite the highlighted text, obviating deletion of the text by the transcriptionist and thereby saving time.

Figure 6:
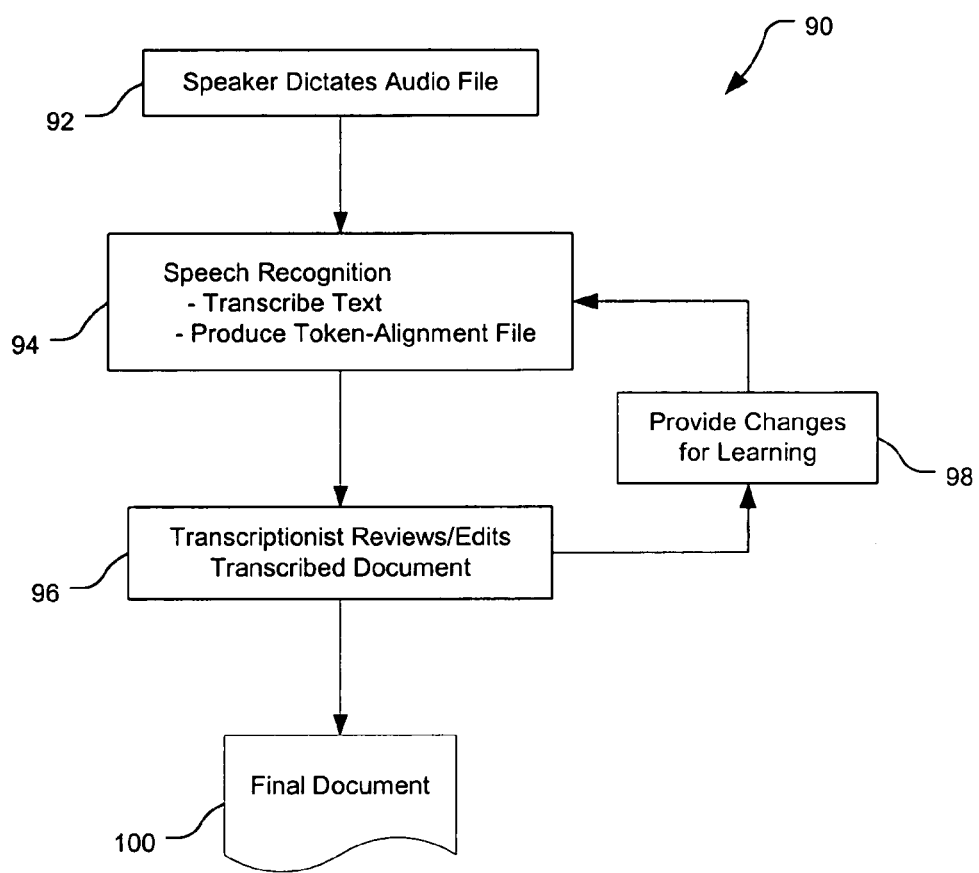
FIG. 6 is a block flow diagram of a process of producing and editing a transcription.

In operation, referring to FIG. 6, with further reference to FIGS. 1-3, a process 90 for producing and editing a transcription of speech using the system 10 includes the stages shown. The process 90, however, is exemplary only and not limiting. The process 90 may be altered, e.g., by having stages added, removed, or rearranged.

At stage 92, the speaker 12 dictates desired speech to be converted to text. The speaker can use, e.g., a hand-held device such as a personal digital assistant, to dictate audio that is transmitted over the network 14 to the voice mailbox 16. The audio is stored in the voice mailbox 16 as an audio file. The audio file is transmitted over the network 22 to the database server 24 and is stored in the database 40.

At stage 94, the automatic transcription device 30 transcribes the audio file. The device 30 accesses and retrieves the audio file from the database 40 through the LAN 26. A speech recognizer of the device 30 analyzes the audio file in accordance with speech models to produce a draft text document 74 from the audio file and store the draft document 74 in the database 40. The device 30 also produces a corresponding token-alignment file that includes the draft document 74 and associates portions of the audio file with the transcribed text of the document 74. The device 30 stores the token-alignment file in the database 40 via the LAN 26.

At stage 96, the transcriptionist reviews and edits the transcribed draft document 74 as appropriate. The transcriptionist uses the editing device 20 to access the database 40 and retrieve the audio file and the token-alignment file that includes the draft text document 74. The transcriptionist plays the audio file and reviews the corresponding text as highlighted or otherwise indicated by the audio cursor 70 and makes desired edits using the text cursor 72. The reviewing of this stage is detailed below with respect to FIG. 7. The word processor 44 produces and stores track-changes information in response to edits made by the transcriptionist.

At stage 98, the track-changes information is provided to the automatic transcription device 30 for use in improving the speech models used by the speech recognizer of the device 30 by analyzing the transcribed draft text and what revisions were made by the transcriptionist. The models can be adjusted so that the next time the speech recognizer analyzes speech that was edited by the transcriptionist, the recognizer will transcribe the same or similar audio to the edited text instead of the draft text previously provided. At stage 100, the word processor provides a final, revised text document as edited by the transcriptionist. This final document can be stored in the database 40 and provided via the network 22 to interested parties, e.g., the speaker that dictated the audio file.

Figure 7:
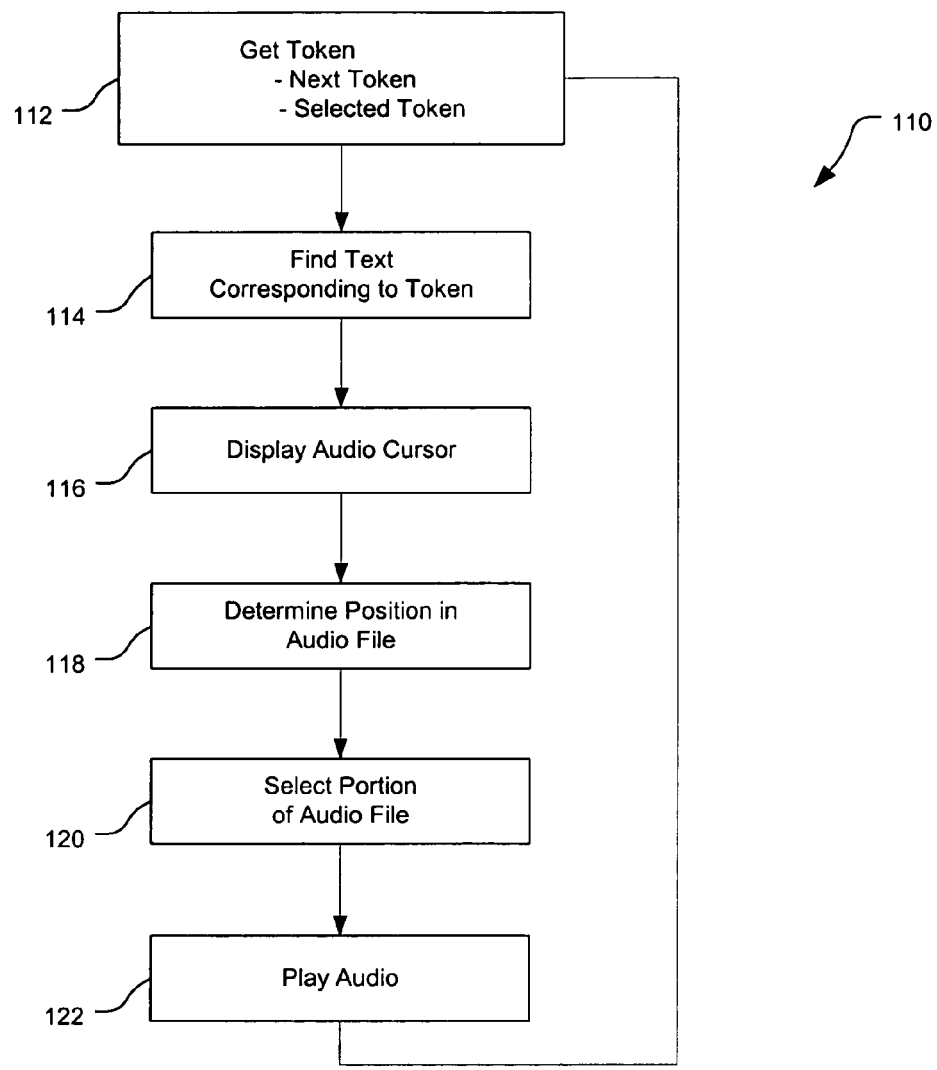
FIG. 7 is a block flow diagram of a process of reviewing a draft transcribed document.

Referring to FIG. 7, with further reference to FIGS. 1-3 and 6, a process 110 for reviewing the draft transcribed document 74, stage 86 of FIG. 6, using the editing device 20 includes the stages shown. The process 110, however, is exemplary only and not limiting. The process 110 may be altered, e.g., by having stages added, removed, or rearranged.

At stage 112, a token in the token-alignment file is obtained. The next token in the file is obtained in the normal course of audio playback in the absence of transcriptionist input. If, however, the transcriptionist causes a change in the location of the audio cursor, then the token corresponding to the new location of the audio cursor is obtained.

At stage 114, the text most nearly associated with the current token is located. This text may be text associated with a token adjacent to the current token, e.g., if the current token does not have text directly associated with it (e.g., a cough). Text entered by the transcriptionist is ignored in determining the most-nearly-associated text.

At stage 116, the cursor control module 50 displays the audio cursor 70 to accentuate the text determined to be most nearly associated with the current token. The control module 50 draws the audio cursor 70 to highlight the text, e.g., drawing the cursor 70 around, near, etc., the determined text. The location of the text corresponding to tokens may be determined dynamically as the token-alignment file is stepped through in order to display the audio cursor 70. Alternatively, locations (e.g., within a document or on a screen) for tokens can be determined before stepping through the token-alignment file to play back the audio (e.g., upon loading of the token-alignment file). In this alternative, the locations can be re-calculated for added or removed text (on the fly when the text is changed, after changes are made, in response to a re-determine command, etc.). Other alternatives are also possible.

At stage 118, the audio file pointer module 48 determines the position in the audio file corresponding to the current token. The module 48 uses the token-alignment file and the selected token to find the location in the audio file corresponding to the current token.

At stage 120, the audio file pointer module 48 selects a portion of the audio file for playback. The module 48 selects a frame of audio associated with the token for submission to the audio playback module 46.

At stage 122, the audio playback module 46 controls playback of the selected audio frame. The module 46 provides control signals to the audio device 54 to audibly play the corresponding audio for the transcriptionist to hear.

Figure 8:
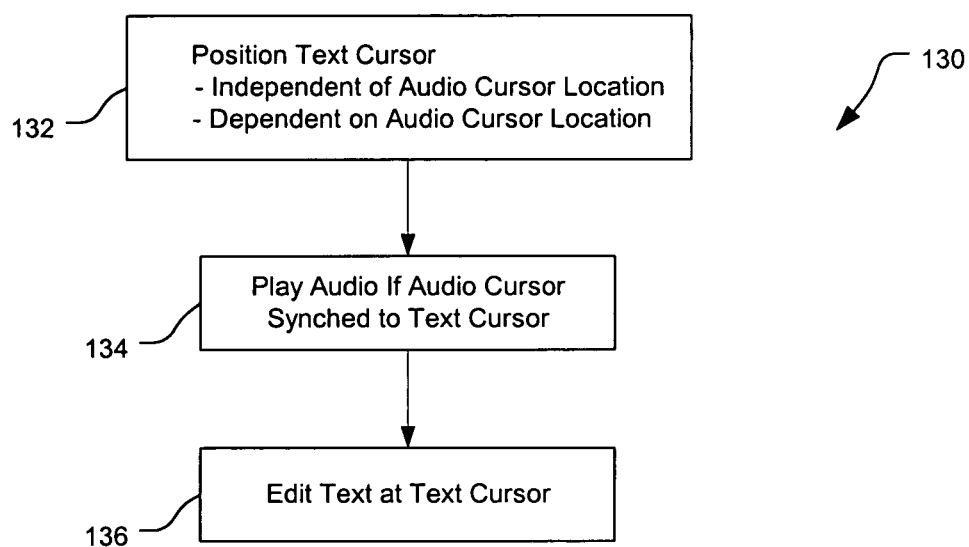
FIG. 8 is a block flow diagram of a process of editing the draft transcribed document.

Referring to FIG. 8, with further reference to FIGS. 1-3 and 6-7, a process 130 for editing the draft transcribed document 74, stage 86 of FIG. 6, using the editing device 20 includes the stages shown. The process 130, however, is exemplary only and not limiting. The process 130 may be altered, e.g., by having stages added, removed, or rearranged.

At stage 132, the transcriptionist positions the text cursor 72 as desired for editing of the document 74. The transcriptionist can move the text cursor 72 independently of the audio cursor 74, e.g., using the keyboard 62 and/or mouse 64. The transcriptionist may also, or alternatively, move the text cursor 72 dependent upon the audio cursor 70 by causing the text cursor 72 to move to, or near to, the position of the audio cursor 70.

At stage 134, the audio corresponding to the location of the text cursor 72 is played if the audio cursor 70 is synched to the text cursor 72. If the transcriptionist causes the audio cursor 70 to move to the location of the text cursor 72, then the audio for the new location of the audio cursor 70 is preferably played to assist the transcriptionist determine whether edits to the text are desired.

At stage 136, desired edits to the text 74 at the location of the text cursor 72 are made by the transcriptionist. With the text cursor 72 placed as desired, edits can be made as indicated by the transcriptionist (e.g., using the keyboard 62) and implemented by the word processor 44. The audio may continue to play while changes are being made at the location of the text cursor 72. The transcriptionist may, however, stop the audio playback using, e.g., the foot pedal 66, keyboard commands, etc. The audio playback may be managed independently of editing of the text 74.

Other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. Further, while two cursors were discussed above, more than two cursors could be employed and implemented by the cursor control module 50. For example, there could be an audio cursor and multiple text cursors, e.g., one controlled by the mouse 64 and one controlled by the keyboard 62. Other arrangements and numbers of cursors could be implemented.

What is claimed is:

1. A method for transcribing an audio recording of a speaker, the method comprising:
using at least one computer configured to perform automatic speech recognition, the at least one computer automatically recognizing the audio recording to produce a draft text of the audio recording;
using the at least one computer further configured to automatically analyze text, the at least one computer automatically analyzing the draft text to identify at least one formatting edit that affects a presentation of the draft text and is specified other than via an explicit command dictated by the speaker in the audio recording;
using the at least one computer further configured to automatically edit text, the at least one computer automatically performing the at least one formatting edit on the draft text to produce an edited text prior to presentation to a human editor for manual editing of the edited text, wherein performing the at least one formatting edit comprises adding text to the draft text and/or replacing text in the draft text with other text; and
providing the edited text to the human editor with the at least one formatting edit performed.

2. The method of claim 1, wherein automatically analyzing the draft text comprises automatically identifying a plurality of words in the draft text for which an acronym may be used, and wherein performing the at least one formatting edit comprises automatically replacing the plurality of words with the acronym.

3. The method of claim 1, wherein automatically analyzing the draft text comprises automatically identifying at least one acronym in the draft text, and wherein performing the at least one formatting edit comprises automatically replacing the at least one acronym with a plurality of words that the at least one acronym represents.

4. The method of claim 1, wherein automatically analyzing the draft text comprises automatically identifying a portion of the draft text to which to add additional text that does not have a corresponding portion in the audio recording.

5. The method of claim 1, wherein automatically analyzing the draft text comprises automatically inferring at least one heading from the draft text and/or the audio recording, and wherein using the at least one computer further configured to automatically edit text further comprises automatically adding the at least one heading to the draft text.

6. The method of claim 1, wherein automatically analyzing the draft text comprises automatically identifying at least one word in the draft text for which an abbreviation may be used, and wherein performing the at least one formatting edit comprises automatically replacing the at least one word with the abbreviation.

7. The method of claim 1, wherein automatically analyzing the draft text comprises automatically identifying at least one abbreviation in the draft text, and wherein performing the at least one formatting edit comprises automatically replacing the at least one abbreviation with at least one word that the abbreviation represents.

8. The method of claim 1, wherein performing the at least one formatting edit comprises replacing text in the draft text with other text.

9. At least one non-transitory computer readable medium encoded with instructions that, when executed on at least one processor, cause the at least one processor to perform a method for transcribing an audio recording of a speaker, the method comprising:
recognizing the audio recording to produce a draft text of the audio recording;
automatically analyzing the draft text to identify at least one formatting edit that affects a presentation of the draft text and is specified other than via an explicit command dictated by the speaker in the audio recording;
automatically performing the at least one formatting edit on the draft text to produce an edited text prior to presentation to a human editor for manual editing of the edited text, wherein performing the at least one formatting edit comprises adding text to the draft text and/or replacing text in the draft text with other text; and
providing the edited text to the human editor with the at least one formatting edit performed.

10. The at least one non-transitory computer readable medium of claim 9, wherein automatically analyzing the draft text comprises automatically identifying a plurality of words in the draft text for which an acronym may be used, and wherein performing the at least one formatting edit comprises automatically replacing the plurality of words with the acronym.

11. The at least one non-transitory computer readable medium of claim 9, wherein automatically analyzing the draft text comprises automatically identifying at least one acronym in the draft text, and wherein performing the at least one formatting edit comprises automatically replacing the at least one acronym with a plurality of words that the at least one acronym represents.

12. The at least one non-transitory computer readable medium of claim 9, wherein automatically analyzing the draft text comprises automatically identifying a portion of the draft text to which to add additional text that does not have a corresponding portion in the audio recording.

13. The at least one non-transitory computer readable medium of claim 12, wherein automatically analyzing the draft text comprises automatically inferring at least one heading from the draft text and/or the audio recording, and wherein the method further comprises automatically adding the at least one heading to the draft text.

14. The at least one non-transitory computer readable medium of claim 9, wherein automatically analyzing the draft text comprises automatically identifying at least one word in the draft text for which an abbreviation may be used, and wherein performing the at least one formatting edit comprises automatically replacing the at least one word with the abbreviation.

15. The at least one non-transitory computer readable medium of claim 9, wherein automatically analyzing the draft text and/or the audio recording comprises automatically identifying at least one abbreviation in the draft text, and wherein performing the at least one formatting edit comprises automatically replacing the at least one abbreviation with at least one word that the abbreviation represents.

16. The at least one non-transitory computer-readable medium of claim 9, wherein performing the at least one formatting edit comprises replacing text in the draft text with other text.

17. An automatic transcription device to transcribe an audio recording of a speaker, the automatic transcription device comprising:
   a speech recognizer to recognize the audio recording to produce a draft text of the audio recording;
   at least one processor to automatically analyze the draft text to identify at least one formatting edit that affects a presentation of the draft text and is specified other than via an explicit command dictated by the speaker in the audio recording, the processor performing the at least one formatting edit on the draft text to produce an edited text prior to presentation to a human editor for manual editing of the edited text so that the edited text can be presented to the human editor with the at least one formatting edit performed,
   wherein performing the at least one formatting edit comprises adding text to the draft text and/or replacing text in the draft text with other text.

18. The automatic transcription device of claim 17, wherein the least one processor automatically identifies a plurality of words in the draft text for which an acronym may be used, and wherein performing the at least one formatting edit comprises automatically replacing the plurality of words with the acronym.

19. The automatic transcription device of claim 17, wherein the least one processor automatically identifies at least one acronym in the draft text, and wherein performing the at least one formatting edit comprises automatically replacing the at least one acronym with a plurality of words that the at least one acronym represents.

20. The automatic transcription device of claim 17, wherein the least one processor identifies a portion of the draft text to which to add additional text that does not have a corresponding portion in the audio recording.

21. The automatic transcription device of claim 20, wherein the least one processor automatically infers at least one heading from the draft text and automatically adds the at least one heading to the draft text.

22. The automatic transcription device of claim 17, wherein the least one processor identifies at least one word in the draft text for which an abbreviation may be used, and wherein performing the at least one formatting edit comprises automatically replacing the at least one word with the abbreviation.

23. The automatic transcription device of claim 17, wherein the least one processor automatically identifies at least one abbreviation in the draft text, and wherein performing the at least one formatting edit comprises automatically replacing the at least one abbreviation with at least one word that the abbreviation represents.

24. The automatic transcription device of claim 17, wherein performing the at least one formatting edit comprises replacing text in the draft text with other text.

\* \* \* \* \*